(12) United States Patent
Karaushi et al.

(10) Patent No.: US 9,859,827 B2
(45) Date of Patent: Jan. 2, 2018

(54) STEPPING-MOTOR CONTROL DEVICE AND CONTROL METHOD

(71) Applicant: THK CO., LTD., Tokyo (JP)

(72) Inventors: Takeo Karaushi, Tokyo (JP); Yuki Nomura, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 14/891,738

(22) PCT Filed: Jun. 4, 2014

(86) PCT No.: PCT/JP2014/064834
§ 371 (c)(1),
(2) Date: Nov. 17, 2015

(87) PCT Pub. No.: WO2014/196561
PCT Pub. Date: Dec. 11, 2014

(65) Prior Publication Data
US 2016/0094169 A1    Mar. 31, 2016

(30) Foreign Application Priority Data

Jun. 6, 2013  (JP) .................................. 2013-119912

(51) Int. Cl.
H02P 8/24    (2006.01)
H02P 8/32    (2006.01)

(52) U.S. Cl.
CPC .  H02P 8/24 (2013.01); H02P 8/32 (2013.01)

(58) Field of Classification Search
CPC ................. H02P 8/24; H02P 8/00; H02P 8/32
See application file for complete search history.

(56) References Cited

U.S. PATENT DOCUMENTS 4,286,202 A    8/1981    Clancy et al.
5,029,264 A *  7/1991    Ito .......................... B41J 19/202
                                                          318/685
(Continued)

FOREIGN PATENT DOCUMENTS

CN    1520024 A    8/2004
CN    1595787 A    3/2005
(Continued)

OTHER PUBLICATIONS

International Search Report dated Jul. 29, 2014, issued in counterpart International Application No. PCT/JP2014/064834 (2 pages).
(Continued)

Primary Examiner — Shawki S Ismail
Assistant Examiner — Muhammad S Islam
(74) Attorney, Agent, or Firm — Westerman, Hattori, Daniels & Adrian, LLP

(57) ABSTRACT

A control device is a control device (1) configured to be switched between open control and servo control and control a stepping motor (3), and includes a control unit (11) configured to reduce a switching frequency to the servo control, to be switched to open control after being switched to servo control to stop a mover at a target position and determine a current supplied to the stepping motor (3) in the open control based on a current command value when the mover is stopped at the target position in the servo control when a deviation between a position of the mover and the target position is a predetermined threshold or more when control of stopping the mover of the stepping motor (3) at the target position through the open control is performed.

7 Claims, 3 Drawing Sheets

(56) References Cited

U.S. PATENT DOCUMENTS

| | | | |
|---|---|---|---|
| 5,097,189 A * | 3/1992 | Ito .......................... | B41J 19/202 318/685 |
| 6,555,985 B1 * | 4/2003 | Kawabata ................. | H02P 8/38 318/432 |
| 2009/0058446 A1 * | 3/2009 | Yamamoto ......... | G01R 31/2891 324/750.28 |

FOREIGN PATENT DOCUMENTS

| | | |
|---|---|---|
| CN | 202026272 U | 11/2011 |
| CN | 102386825 A | 3/2012 |
| EP | 1020987 A1 | 7/2000 |
| JP | 56-15193 A | 2/1981 |
| JP | 5-163988 A | 6/1993 |
| JP | 6-217575 A | 8/1994 |
| JP | 11-44243 A | 2/1999 |
| JP | 2002-27783 A | 1/2002 |
| JP | 2006-393 A | 1/2006 |
| JP | 2006-211012 A | 8/2006 |

OTHER PUBLICATIONS

Office Action dated Mar. 3, 2017, issued in counterpart Chinese Application No. 201480031632.2, with English tranlsation. (16 pages).

\* cited by examiner

STEPPING-MOTOR CONTROL DEVICE AND CONTROL METHOD

TECHNICAL FIELD

The present invention relates to a control device and a control method of a stepping motor.

Priority is claimed on Japanese Patent Application No. 2013-119912, filed Jun. 6, 2013, the content of which is incorporated herein by reference.

BACKGROUND ART

As a control method of a stepping motor, open control of performing switching of excitation by a pulse signal and servo control of feeding a position of a rotor of a stepping motor back and performing excitation according to the position are switched (for example, Patent Literature 1).

CITATION LIST

Patent Literature

[Patent Literature 1] Japanese Unexamined Patent Application, First Publication No. H05-163988

SUMMARY OF INVENTION

Technical Problem

When the switching of the servo control occurs frequently, precision of positioning of the stepping motor by the open control and responsiveness thereof may be deteriorated.

The present invention provides a control device and a control method of a stepping motor that are capable of reducing a switching frequency to servo control.

Solution to Problem

According to a first aspect of the present invention, a control device of a stepping motor includes a control unit configured to be switched to open control after being switched to servo control to stop a mover at a target position and determine a current supplied to the stepping motor in the open control based on a current command value when the mover is stopped at the target position in the servo control when a deviation between a position of the mover and the target position is a predetermined threshold or more when control of stopping the mover of the stepping motor at the target position through the open control is performed.

According to a second aspect of the present invention, in the control device of the stepping motor according to the first aspect, the control unit determines the current supplied to the stepping motor when the control of stopping the mover at the target position through the open control is performed based on the current command value when the mover is stopped at the target position through the servo control.

According to a third aspect of the present invention, in the control device of the stepping motor according to the first aspect or the second aspect, when a maximum value of the current command value upon stoppage of the mover at the target position through the servo control is larger than the current supplied to the stepping motor in the open control, the control unit updates the current supplied to the stepping motor to the maximum value in the open control.

According to a fourth aspect of the present invention, a control method is performed by a control device configured to drive a stepping motor, and the control method includes a control step of switching the control device to open control after switching to servo control to stop a mover at a target position and determining a current supplied to the stepping motor in the open control based on a current command value when the mover is stopped at the target position in the servo control when a deviation between a position of the mover and the target position is a predetermined threshold or more when control of stopping the mover of the stepping motor at the target position through the open control is performed.

Advantageous Effects of Invention

According to the above-mentioned control device and control method of the stepping motor, based on a current command value used when a mover is returned to a target position through servo control when a position at which the mover is stopped deviates from the target position, a current supplied to the stepping motor in the open control is determined. Accordingly, a torque that endures disturbance in which the position of the stopped mover deviates can be generated in the open control, and the switching frequency to the servo control can be reduced.

DESCRIPTION OF EMBODIMENT

Hereinafter, a control device and a control method of a stepping motor according to an embodiment of the present invention will be described with reference to the accompanying drawings.

Figure 1:
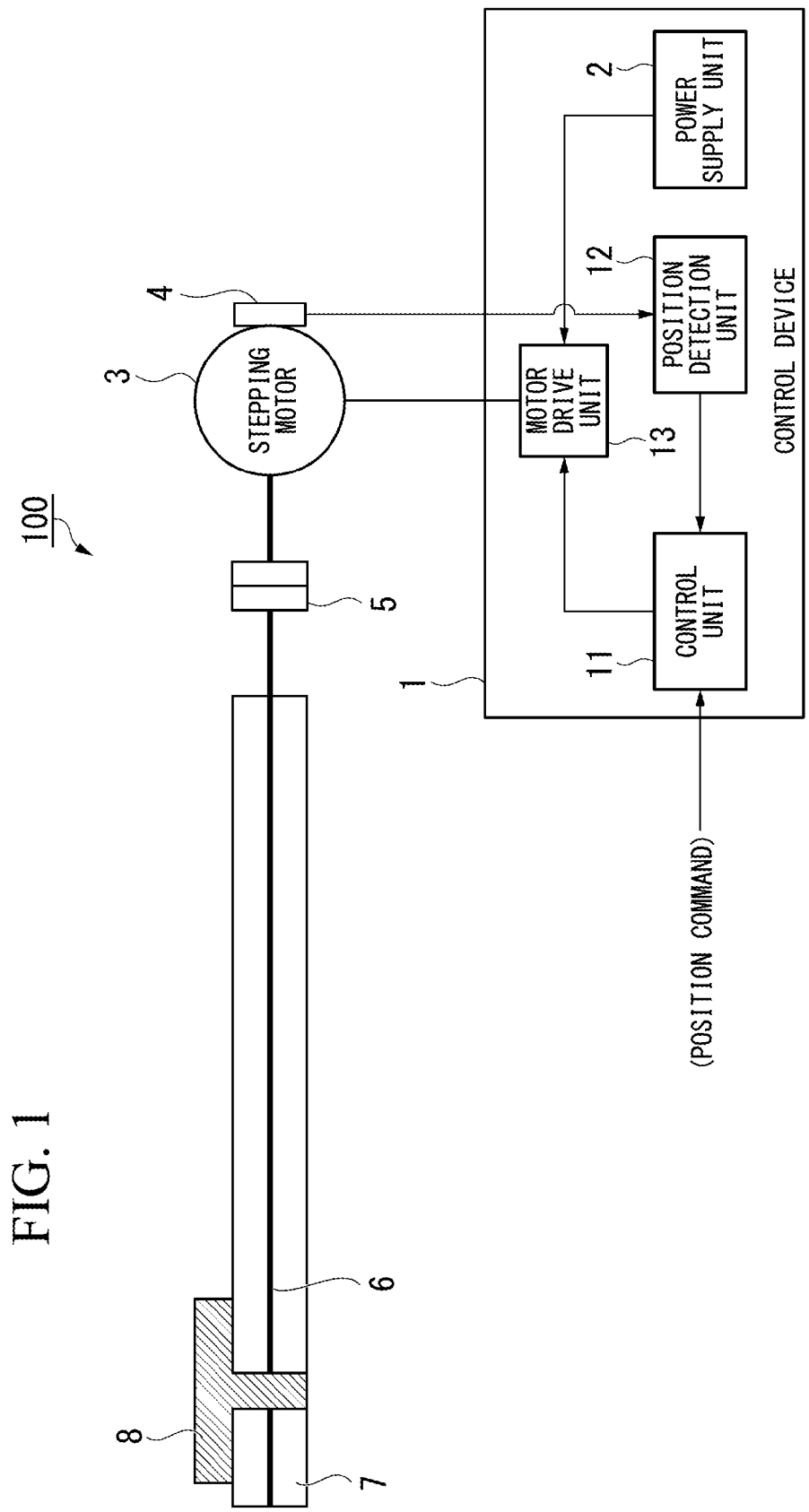
FIG. 1 is a block diagram showing a configuration example of a motor control system including a control device according to an embodiment.

FIG. 1 is a block diagram showing a configuration example of a motor control system 100 including a control device 1 according to the embodiment. The motor control system 100 includes the control device 1, a power supply unit 2, a stepping motor 3, an encoder 4, a shaft coupling 5, a drive shaft 6, a base 7 and a drive table 8.

As shown in FIG. 1, the control device 1 drives the stepping motor 3 by outputting power supplied from the power supply unit 2 to the stepping motor 3 according to a position command input from the outside. The stepping motor 3 outputs rotational movement by rotating a rotor (a mover) according to the input power. The encoder 4 configured to detect a position of the rotor and output a signal showing the detected position of the rotor is attached to the stepping motor 3.

The shaft coupling 5 is connected to the rotor of the stepping motor 3. The shaft coupling 5 transmits the rotational movement output by the stepping motor 3 to a drive shaft (a ball screw) 6. The drive shaft 6 rotates according to the rotational movement output by the stepping motor 3, and slides the drive table 8 provided on the base 7.

When the driving of the stepping motor 3 is started, the control device 1 performs energization based on the position of the rotor detected by the encoder 4. At this time, the control device 1 drives the stepping motor 3 such that the drive table 8 is moved to a target position shown by a position command input from the outside. The control device 1 performs switching of open control of supplying a pulse signal (power) and driving the stepping motor 3, and servo control of supplying power and driving the stepping motor 3 based on a difference between the position of the rotor of the stepping motor 3 and the target position.

As shown in FIG. 1, the control device 1 includes a control unit 11, a position detection unit 12 and a motor drive unit 13. A position command and position information are input into the control unit 11. The position information is information showing an electrical angle of the rotor calculated by the position detection unit 12 based on a signal input from the encoder 4. The control unit 11 selects which of the open control or the servo control is used to drive the stepping motor 3. When the open control is used, the control unit 11 generates a control signal for outputting a pulse signal, which drives the rotor from the position of the rotor shown by the position information input from the position detection unit 12 to the target position, to the motor drive unit 13. When the servo control is used, the control unit 11 generates a control signal including a current command value calculated by PI control or PID control based on the difference between the position of the rotor shown by the position information and the target position. The control unit 11 outputs the generated control signal to the motor drive unit 13. The motor drive unit 13 converts the power supplied from the power supply unit 2 to supply the power to the stepping motor 3, and rotates the rotor of the stepping motor 3 based on the control signal output from the control unit 11.

Figure 2:
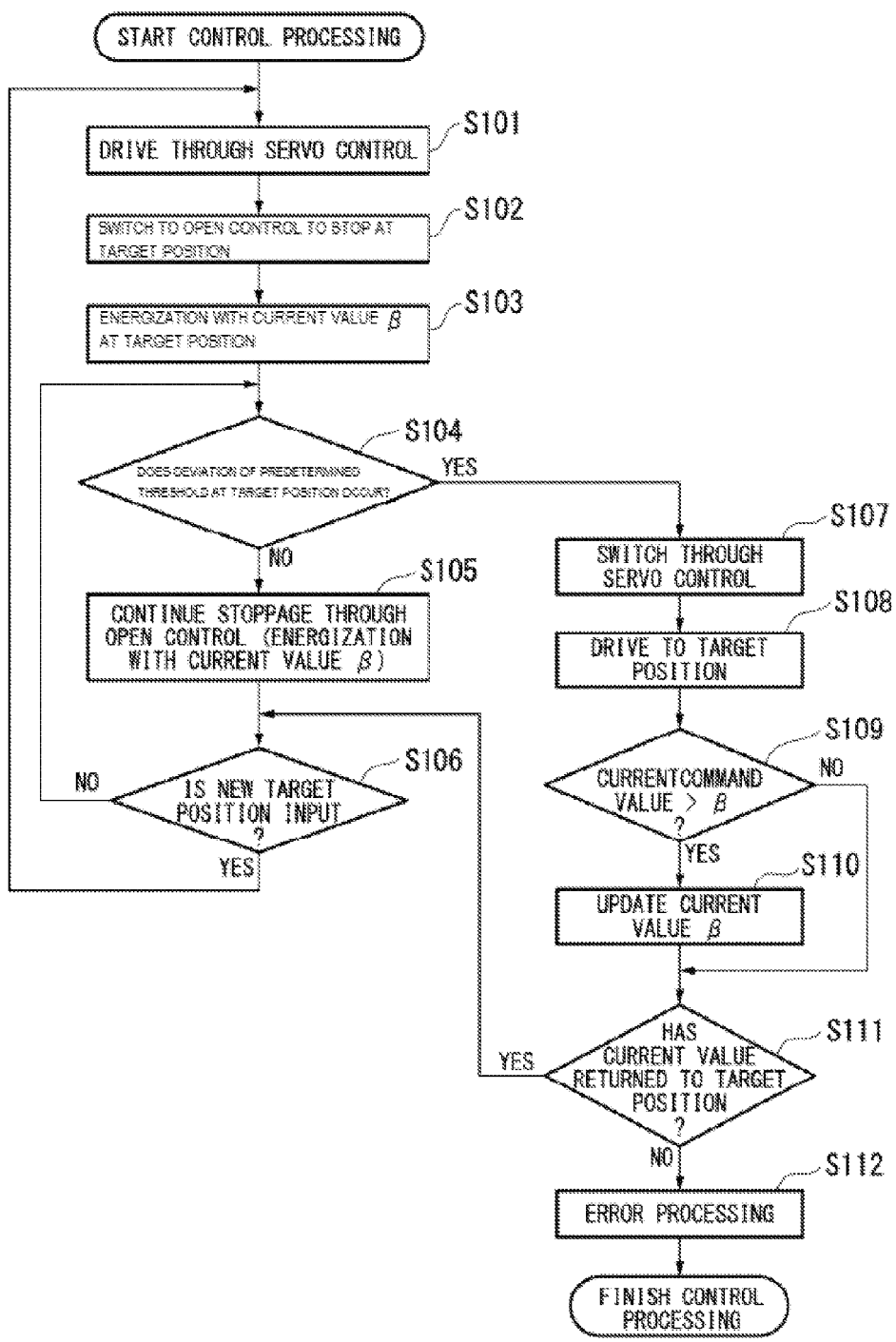
FIG. 2 is a flowchart showing control processing performed by the control device according to the embodiment.

FIG. 2 is a flowchart showing control processing performed by the control device 1 according to the embodiment.

When a position command is input to the control device 1 of the stepping motor 3, the control unit 11 drives the stepping motor 3 using the servo control (step S101).

The control unit 11 is switched to the open control to stop the rotor at the target position when the position of the rotor of the stepping motor 3 reaches the target position (step S102).

The control unit 11 sets a pulse signal supplied to the stepping motor 3 to a current value $\beta$ while the rotor is disposed at the target position (step S103).

Here, in an initial state, the current value $\beta$ is set to the current value that applies a predetermined torque to maintain stoppage of the rotor.

The control unit 11 determines whether deviation of a predetermined threshold or more occurs at the target position and the position of the rotor while the rotor is stopped at the target position (step S104). When the deviation of the threshold or more does not occur (step S104: NO), the control unit 11 continues the control for stopping the rotor by the open control (step S105).

Meanwhile, when deviation of the threshold or more occurs (step S104: YES), the control unit 11 causes the processing to advance to step S107.

The threshold is applied at, for example, an electrical angle. When an angle of a difference between an electrical angle corresponding to the target position and an electrical angle showing position information input from the position detection unit 12 is a threshold (n degrees) or more, the control unit 11 determines that the deviation of the threshold or more occurs. The threshold is determined in advance based on resolution of the encoder 4, resolution in driving of the stepping motor 3, or the like. For example, a value smaller than the deviation when loss of synchronism in the stepping motor 3 occurs may be set to the threshold. Accordingly, the stepping motor 3 can correct the deviation before the loss of synchronism even when the deviation occurs.

The control unit 11 determines whether a new position command is input (step S106), and when the new position command is input (step S106: YES), causes the processing to return to step S101 to repeatedly perform the processing.

Meanwhile, when the new position command is not input (step S106: NO), the control unit 11 causes the processing to return to step S104 to continue the control of stopping the rotor.

When the deviation of the threshold or more occurs (step S104: YES), the control unit 11 is switched to the servo control (step S107) and performs the control of rotating the rotor to the target position (step S108).

The control unit 11 determines whether the current command value calculated when the rotor is rotated to the target position is larger than the current value $\beta$ (step S109), and when the current command value is larger than the current value $\beta$ (step S109: YES), updates the current value $\beta$ to a value shown by the current command value (step S110). Meanwhile, when the current command value is the current value $\beta$ or less (step S109: NO), the control unit 11 causes the processing to advance to step S111.

The control unit 11 determines whether the rotor returns to the target position using the servo control (step S111). When the rotor returns to the target position (step S111: YES), the control unit 11 causes the processing to advance to step S106, and when the rotor does not return to the target position (step S111: NO), the control unit 11 performs error processing (step S112) to terminate the control processing.

Here, determination of whether the rotor returns to the target position in step S111 is performed by, for example, determination of whether the difference between the position of the rotor and the target position is the above-mentioned threshold or less. In addition, step S111 may be performed, for example, when a predetermined time elapses from the switching to the servo control, when the current command value calculated by the control unit 11 is less than the predetermined value, or the like.

In addition, the error processing is processing performed when the position of the rotor does not return to the target position after deviation from the target position, for example, when the rotor cannot return to the target position due to an influence of the disturbance or the like, and processing of outputting a notice to a user or an operator of the control device 1 of occurrence of abnormalities.

As the control device 1 according to the embodiment performs the above-mentioned control processing (FIG. 2), when the stepping motor 3 is stopped in the open control, as a control is switched to the servo control to returns the rotor to the target position and stops when the drive table 8 or the like receives the disturbance and the position of the rotor deviates from the target position, even though the loss of synchronism in the open control occurs and origin return processing or the like is not performed, the control of the stepping motor 3 can continue.

Here, the control device 1 updates the current value $\beta$ to the current command value when the current command value calculated while the rotor returns to the target position and stops from the switching to the servo control is larger than the current value $\beta$ when the rotor is stopped in the open control. Accordingly, the current value (the current command value) corresponding to the torque required when the rotor returns to the target position and stops can be reflected in the open control even when the influence of the disturbance is received, and the rotor can be continuously stopped at the target position in the case in which the same disturbance occurs again when the rotor stops in the open control. That is, the torque that can endure the disturbance that causes deviation of the position of the stopped rotor can be generated in the open control, and a frequency of switching from the open control to the servo control can be reduced.

In addition, as the control processing is performed by determining the current value β as a small value, for example, determining the minimum current value to stop the rotor as an initial value, the open control of stopping the rotor using a stopping torque required according to a use status of the motor control system 100 can be performed. Accordingly, even when a value appropriate for the current value β is not determined in advance, the current value β appropriate for the use status of the motor control system 100 can be set, and thus unnecessary power consumption can be suppressed.

Figure 3:
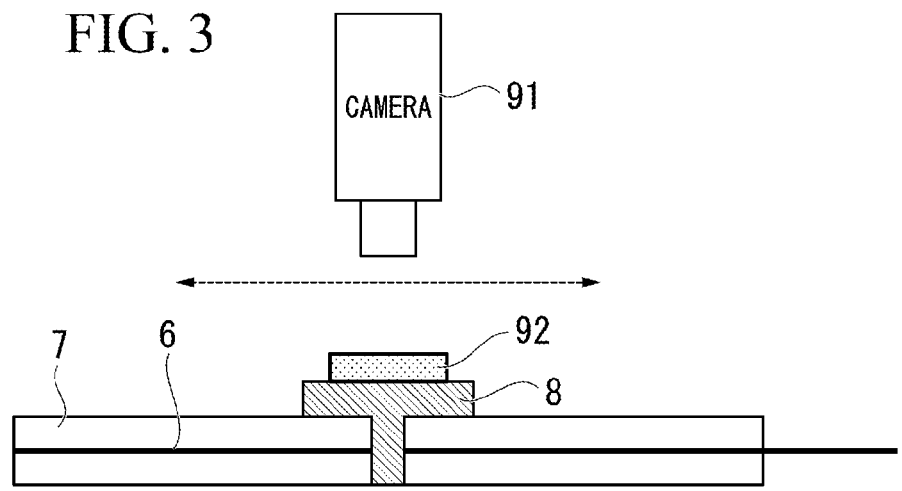
FIG. 3 is a view showing a first application example of the motor control system according to the embodiment.
Figure 4:
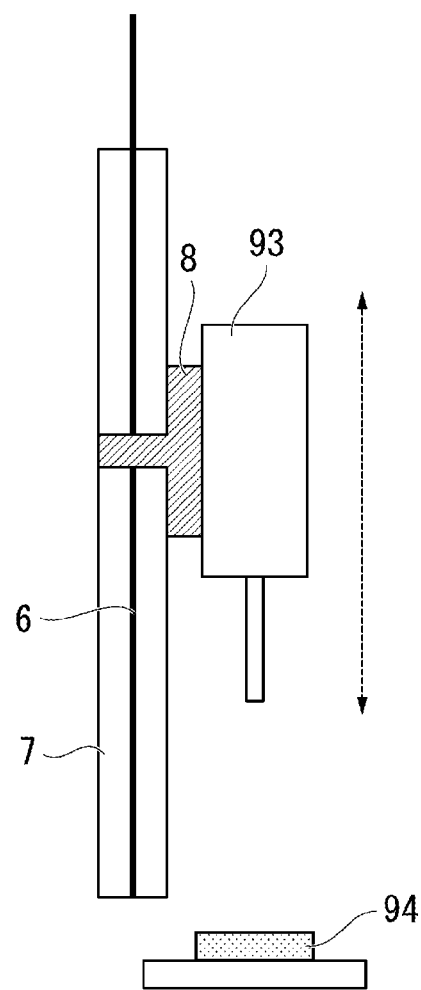
FIG. 4 is a view showing a second application example of the motor control system according to the embodiment.

FIGS. 3 and 4 are views showing an application example of the motor control system 100 according to the embodiment. In the application example shown in FIG. 3, inspection of a conveyance article 92 or the like is performed based on an image obtained by photographing the conveyance article 92 placed on the drive table 8 using a fixed camera 91. The conveyance article 92 is, for example, a CD, a DVD, electronic parts, or the like. In the application example shown in FIG. 3, inspection of the CD, DVD, electronic parts, or the like is performed based on an image of a carved seal or a print of a surface obtained by the camera 91. For this reason, if the drive table 8 is moved due to the disturbance or the like when the conveyance article 92 (the drive table 8) is stopped (upon photographing), determination of inferiority is performed. As the above-mentioned control processing is performed, deviation of the conveyance article 92 from the target position due to the influence of the disturbance can be suppressed, and probability of the determination of inferiority caused by the drive system can be reduced.

In the application example shown in FIG. 4, the base 7 is fixed such that the drive table 8 is moved in a vertical direction, a nozzle 93 attached to the drive table 8 is moved vertically, and ink or the like injected from the nozzle 93 is attached to a target 94 placed immediately under the nozzle 93. In the above-mentioned device, the nozzle 93 may be moved when the control of stopping the nozzle 93 (the drive table 8) is performed due to the weight of the nozzle 93. As the above-mentioned control processing is performed, movement of the nozzle 93 due to the influence of the weight when the nozzle 93 is stopped can be suppressed, and the ink or the like can be attached to a predetermined position of the target 94.

The above-mentioned control device 1 may have a computer system provided therein. In this case, a process of the above-mentioned control processing is recorded on a computer-readable recording medium in the form of a program and the program is executed by the computer to perform the processing. Here, the computer-readable recording medium may be a magnetic disk, a magneto-optical disc, a CD-ROM, a DVD-ROM, a semiconductor memory, or the like. In addition, the computer program may be distributed to computers by a communication line, and the computers that have received the program may execute the program.

The embodiment is exemplarily provided and is not intended to limit the scope of the present invention. Novel embodiments may be realized in various other types, and various omissions, substitutions and modifications may be made without departing from the scope of the present invention. These embodiments and modifications thereof are included in the following claims and the scope of the present invention and included in the equivalent scope of the present invention disclosed in the claims. For example, instead of the processing (step S101) driven by the servo control after the position command is input, the rotor may be rotated to the target position through the open control. In addition, the switching timing between step S101 and step S102 may be set to switching to the open control when a distance with respect to the target position is a predetermined distance or less.

In addition, in the embodiment, while the control device 1 has a configuration of driving the rotary type stepping motor 3, a linear type stepping motor (a linear motor) may be driven to move the mover.

In addition, in the above-mentioned control processing, the stepping motor 3 may be driven at a pulse signal according to the current value β in cases other than the control of stopping the motor in the open control as well.

In addition, in the above-mentioned control processing, the current command value in step S109 and step S110 may be a maximum value of the current command value from movement of the rotor to the target position in the servo control to stoppage at the target position. Accordingly, the rotor can be stopped upon the open control using the torque corresponding to the maximum torque required when the rotor returns to the target position, and the influence of the disturbance can be suppressed.

INDUSTRIAL APPLICABILITY

The present invention can be applied to a device or a system that requires the control of stopping the rotor or the mover through the open control with respect to the stepping motor.

REFERENCE SIGNS LIST 1 control device
3 stepping motor
11 control unit

The invention claimed is:
1. A control device of a stepping motor comprising:
a control unit configured to be switched to open control to maintain stoppage of a mover at a target position with a current value that applies a predetermined torque after performing initial servo control,
the control unit further configured to:
determine whether a deviation of a predetermined threshold at the target position occurs;
continue stoppage through the open control if the deviation of the predetermined threshold at the target position does not occur;
switch to servo control if the deviation of the predetermined threshold at the target position occurs;
drive to the target position;
update the current value;
determine whether the current value returns to the target position; and
perform error processing to terminate a control processing if the current value does not return to the target position; and
a position detection unit configured to provide a position information of the mover, wherein
the control unit selects which of the open control and the servo control is used to drive the stepping motor, and when the open control is used, the control unit generates a control signal for outputting a pulse signal to drive the mover to the target position according to the position information from the position detection unit.

2. The control device of the stepping motor according to claim 1, wherein the control unit determines the current value supplied to the stepping motor when the control of stopping the mover at the target position through the open control is performed based on a current command value when the mover is stopped at the target position through the servo control.

3. The control device of the stepping motor according to claim 1, wherein, when a maximum value of a current command value upon stoppage of the mover at the target position through the servo control is larger than the current value supplied to the stepping motor in the open control, the control unit updates the current value supplied to the stepping motor to the maximum value in the open control.

4. A control method performed by a control device configured to drive a stepping motor, the control method comprising:
   a controlling step of switching the control device to open control to maintain stoppage of a mover at a target position with a current value that applies a predetermined torque after performing initial servo control,
   the controlling step further comprising:
      determining whether a deviation of a predetermined threshold at the target position occurs;
      continuing stoppage through the open control if the deviation of the predetermined threshold at the target position does not occur;
      switching to servo control if the deviation of the predetermined threshold at the target position occurs;
      driving to the target position;
      updating the current value;
      determining whether the current value returns to the target position; and
      performing error processing to terminate a control processing if the current value does not return to the target position; and
   a detecting step of determining a position information of the mover, wherein
   the controlling step selects which of the open control and the servo control is used to drive the stepping motor, and
   when the open control is used, the controlling step generates a control signal for outputting a pulse signal to drive the mover to the target position according to the position information from the detecting step.

5. The control device of the stepping motor according to claim 2, wherein, when a maximum value of the current command value upon stoppage of the mover at the target position through the servo control is larger than the current value supplied to the stepping motor in the open control, the control unit updates the current value supplied to the stepping motor to the maximum value in the open control.

6. The control device of the stepping motor according to claim 1, wherein the control unit is configured to be set to a second threshold smaller than a deviation when loss of synchronism in the stepping motor occurs after being switched to the open control to maintain stoppage of the mover at the target position.

7. The control method according to claim 4, further comprising setting a second threshold smaller than a deviation when loss of synchronism in the stepping motor occurs after switching the control device to open control to maintain stoppage of the mover at the target position.

* * * * *